J. W. MILLER.
PACKING GASKET.
APPLICATION FILED MAR. 27, 1908.

952,128.

Patented Mar. 15, 1910.

Witnesses
J. C. Simpson
M. J. Miller

Inventor
John W. Miller,
By Chandler & Chandler
Attorneys

UNITED STATES PATENT OFFICE.

JOHN W. MILLER, OF HARRISBURG, PENNSYLVANIA.

PACKING-GASKET.

952,128.  Specification of Letters Patent. Patented Mar. 15, 1910.

Application filed March 27, 1908. Serial No. 423,652.

*To all whom it may concern:*

Be it known that I, JOHN W. MILLER, a citizen of the United States, residing at Harrisburg, in the county of Dauphin, State of Pennsylvania, have invented certain new and useful Improvements in Packing-Gaskets; and I do hereby declare the following to be a full, clear, and exact description of the invention, such as will enable others skilled in the art to which it appertains to make and use the same.

This invention relates to packing gaskets and in carrying out my invention I have in view the provision of a gasket which may be compressed to a slight degree when placed in a union.

Broadly speaking, the gasket embodied in my invention comprises a compressible body portion such as asbestos, and facing rings which are preferably of sheet copper. While gaskets of this general character have before been devised, the facing rings have been connected in such a manner that the gasket is thicker at the point of connection of the rings than at any other point but this is undesirable inasmuch as such portion of the ring is less compressible than the true body of the ring. I have therefore aimed, in carrying out my invention, to so connect the facing rings that the gaskets will be thinner at their point of connection with each other than at any other point but permitting of the entire true body of the gasket being compressed to the proper degree.

Figure 1:
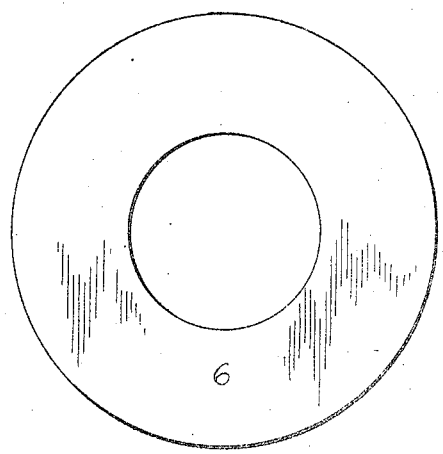
Figure 2:
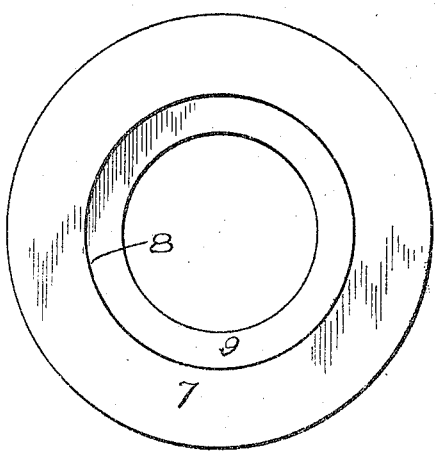
Figure 3:
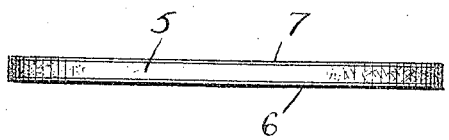
Figure 4:
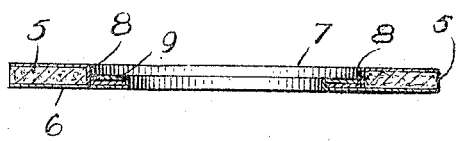

In the accompanying drawings, Figure 1 is a plan view of one face of the gasket, Fig. 2 is a similar view of the other face thereof, Fig. 3 is an edge view, and, Fig. 4 is a vertical transverse sectional view, the said view being in detail.

As shown in the drawings, the gasket is made up of a compressible body portion 5 which is preferably of asbestos but which may be of any other suitable material which is compressible to a slight degree. The gasket also includes in its structure, facing rings, one of which is indicated by the numeral 6 and the other by the numeral 7. The rings 6 and 7 are preferably stamped or otherwise formed from sheet copper although other sheet material may be used if found expedient. The facing ring 7 is formed at its inner edge with an offset flange including a portion 8 which extends at right angles to the body of the ring and a portion 9 which extends inwardly and the ring 6 has its inner edge portion bent or returned over the said portion 9 of the ring 7, the body portion 5 of the gasket being of such dimensions that its outer edge registers with the outer edges of the two facing rings and its inner edge rests against the portion 8 of the offset flange at the inner edge of the ring 7.

From the foregoing, it will be understood that the true body of the ring is of three-ply structure including two plies of non-compressible or metallic material and a single ply of compressible material. By returning the inner edge portion of the ring 6 over the portion 9 of the offset flange at the inner edge of the ring 7 and by stamping these two portions of the ring together, the gasket is formed of less thickness at this point than at any other point, and the body portions of the two rings are free to move toward each other when pressure is exerted against opposite sides of the rings which of course occurs when the ring is placed between the two members of the union or in any other similar pipe connection.

What is claimed, is:—

1. A gasket comprising a compressible body portion, and metallic facing rings, said rings having their inner edges interlocked.

2. A gasket comprising a compressible body portion, and non-compressible facing rings, said rings having their inner edges interlocked.

3. A gasket comprising a compressible body portion, and metallic facing rings, one of said rings having its inner edge bent to form an offset flange and the inner edge of the other ring being bent around said flange.

4. A gasket comprising a compressible body portion, and metallic facing rings, one of said rings having its inner edge bent to form an offset flange, the inner edge of the other ring being returned over said flange.

5. A gasket comprising a compressible body portion, and metallic facing rings, one of said rings having its inner edge bent to form an offset flange, the inner edge of the body portion of the gasket resting against a portion of said flange, the inner edge of the other ring being returned over said flange.

6. A gasket comprising a compressible body portion, and metallic facing rings, said rings having their inner edges interlocked, the gasket being of less thickness at its inner edge than at any other point.

In testimony whereof, I affix my signature, in presence of two witnesses.

JOHN W. MILLER.

Witnesses:
 J. T. MILLER,
 S. H. ZIMMERMAN.